United States Patent [19]
Greer et al.

[11] Patent Number: 5,112,193
[45] Date of Patent: May 12, 1992

[54] FAN BLADE AXIAL RETENTION DEVICE

[75] Inventors: John Greer, Burlington; Haruhisa Chijiiwa, Mississauga; Michael J. Dowhan, Milton, all of Canada

[73] Assignee: Pratt & Whitney Canada, Longueuil, Canada

[21] Appl. No.: 580,885

[22] Filed: Sep. 11, 1990

[51] Int. Cl.$^5$ ............................................. F01D 5/32
[52] U.S. Cl. ............................................. 416/220 R
[58] Field of Search ................ 416/219 R, 220 R, 248

[56] References Cited

U.S. PATENT DOCUMENTS

| | | | |
|---|---|---|---|
| 3,043,562 | 7/1962 | Van Nest et al. | 416/220 R |
| 3,644,058 | 2/1972 | Barnabei et al. | 416/220 |
| 3,744,930 | 7/1973 | Carroll | 416/220 |
| 3,853,425 | 12/1974 | Scalzo et al. | 416/220 R |
| 4,470,756 | 9/1984 | Rigo et al. | 416/220 R |

FOREIGN PATENT DOCUMENTS

| | | | |
|---|---|---|---|
| 2358545 | 2/1978 | France | 416/220 R |
| 26210 | 2/1982 | Japan | 416/220 R |
| 2089899 | 6/1982 | United Kingdom | 416/220 R |

Primary Examiner—John T. Kwon

[57] ABSTRACT

A fan blade retention device includes a collar (13) inserted into a circumferential groove (14) cut into the hub (6) of a turbofan engine. The outward facing groove (14) is positioned aft of the fan blade fixing channel (15). When the fan blade root (11) is completely received within the blade fixing channel (15), the blade root (11) contacts the collar (13) and is prevented from traveling further aft. If the collar 13 is segmented, an annular rear cover plate (19) holds the segmented collar (13) radially within the groove (14).

4 Claims, 4 Drawing Sheets

FAN BLADE AXIAL RETENTION DEVICE

DESCRIPTION

Technical Field

This invention relates to fan blade axial retention devices and more particularly to fan blade retention devices oriented at an angle to the centerline of the engine.

Background Art

In turbofan engines, fan blade fixing commonly takes the form of a dovetail joint. In conventional configurations, the base of the joint lies in a plane aligned parallel to the centerline of the engine. Because of gas path aerodynamics, conventional engines require that the blade platform be positioned to maintain the gas path profile established by the nose cone. In engines with aligned blade fixing, this means that a significant distance exists between the outer hub diameter and the aft blade platform. This distance, combined with the mass of the blade root comprising the distance, causes an additional load on the hub due to the centrifugal forces which act on the blade as the hub assembly rotates. To compensate for this additional load, it is necessary to make the blade root "stockier" than the blade, which compounds the problem. These additional loads result in undesired hub strain and bearing stress within the hub. A significant amount of the loading can be eliminated, however.

A fan blade fixing means configuration at an inclined angle relative to the engine centerline reduces the distance from the blade platform to the outer hub diameter. As a result, blade mass is reduced as well as the centrifugal force associated with the blade mass. There is a tradeoff, however. In conventional configurations, the load on the fan blade due to centrifugal forces, is almost entirely handled by the dovetail joint. This is possible because the centrifugal force appears solely as a radial force acting up through the fan blade. With the blade fixing at an incline, however, the centrifugal force translates into both a radial force and a axial force and it becomes necessary to secure the blade against both forces.

Existing designs secure the blade axially by a "hook" formed on the forward edge of the blade root. The hook contacts the hub, or a locking ring, and physically prevents the blade from traveling up the blade fixing incline. A disadvantage of this configuration is the required size of the hook, especially for larger engines. Gains in the reduction of blade mass produced by the inclined configuration, are lost as the hook is necessarily designed larger and larger with increasing engine size. Moreover, at some point hooks are no longer feasible from a physical constraint standpoint. Another disadvantage of this design is that the entire axial component of the centrifugal force is localized to the contact area between the hook and the hub. Since that contact area is relatively small, the load is analogous to a point load and as such produces a concentration in stress.

DISCLOSURE OF INVENTION

Objects of the present invention include provision of an axial retention device for a turbofan blade fixed to the fan hub at an incline relative to the engine centerline.

According to one aspect of the present invention, a fan blade and hub having a sloped attachment is provided with a collar inserted in a groove cut into the hub. The groove opens radially outward and is located aftward of the sloped attachment. The collar prevents the fan blade from moving up the incline in the aft direction. In one embodiment, the collar comprises a ring which fits into the outwardly facing groove cut into the hub. The groove is located aft and adjacent to the female half of the blade fixing means, which in this example is a dovetail channel. The base of the blade root forms the male dovetail. The groove and the dovetail channel are positioned such that when the blade root is inserted completely into the dovetail channel, it contacts the collar and is prevented from traveling further up the incline.

Advantages of this design include the nature of the relatively small blade root "footprint" contacting the collar. When the blade root contacts the collar, the axial component of the centrifugal force acting on the blade transfers to the collar and is distributed circumferentially over the collar's length. Consequently, the load is distributed along the length of the groove, thereby reducing local hub stress concentrations which might be associated with, a point load.

According to another aspect of the present invention, the collar may comprise a plurality of segments. When the collar is split into segments, the present invention provides an annular rear cover plate which retains the segmented collar radially in the groove. The cover plate attaches to the hub aft of the circumferential groove, in an area outside of the high stress zone produced by the centrifugal loading on the hub. For example, the rear cover plate may comprise an annular cover plate which slides over the segmented collar, thereby preventing the collar from leaving the groove. The cover plate would be, for instance, riveted to a flange at the rear of the hub. The flange would be positioned such that under load, none of the rivet holes produce any appreciable stress to the hub.

One of the advantages of the present invention's collar, one piece or segmented, is that no holes are required in the body of the hub to secure the radial retaining device. A hole in the hub, especially in close proximity to a highly stressed region such as the groove, would create a considerable stress concentration in the hub under load. To overcome these stress concentrations, hub design must be larger and less economical. In the present invention, however, hub stress is minimized because the collar itself requires no attachment holes and the segmented collar cover plate employs rivets which attach outside the stress area of the hub. Therefore hub design can be smaller and more economical.

According to another aspect of the present invention, a front ring is provided which prevents the fan blades from sliding forward, down the incline.

BEST MODE FOR CARRYING OUT THE INVENTION

Figure 1:
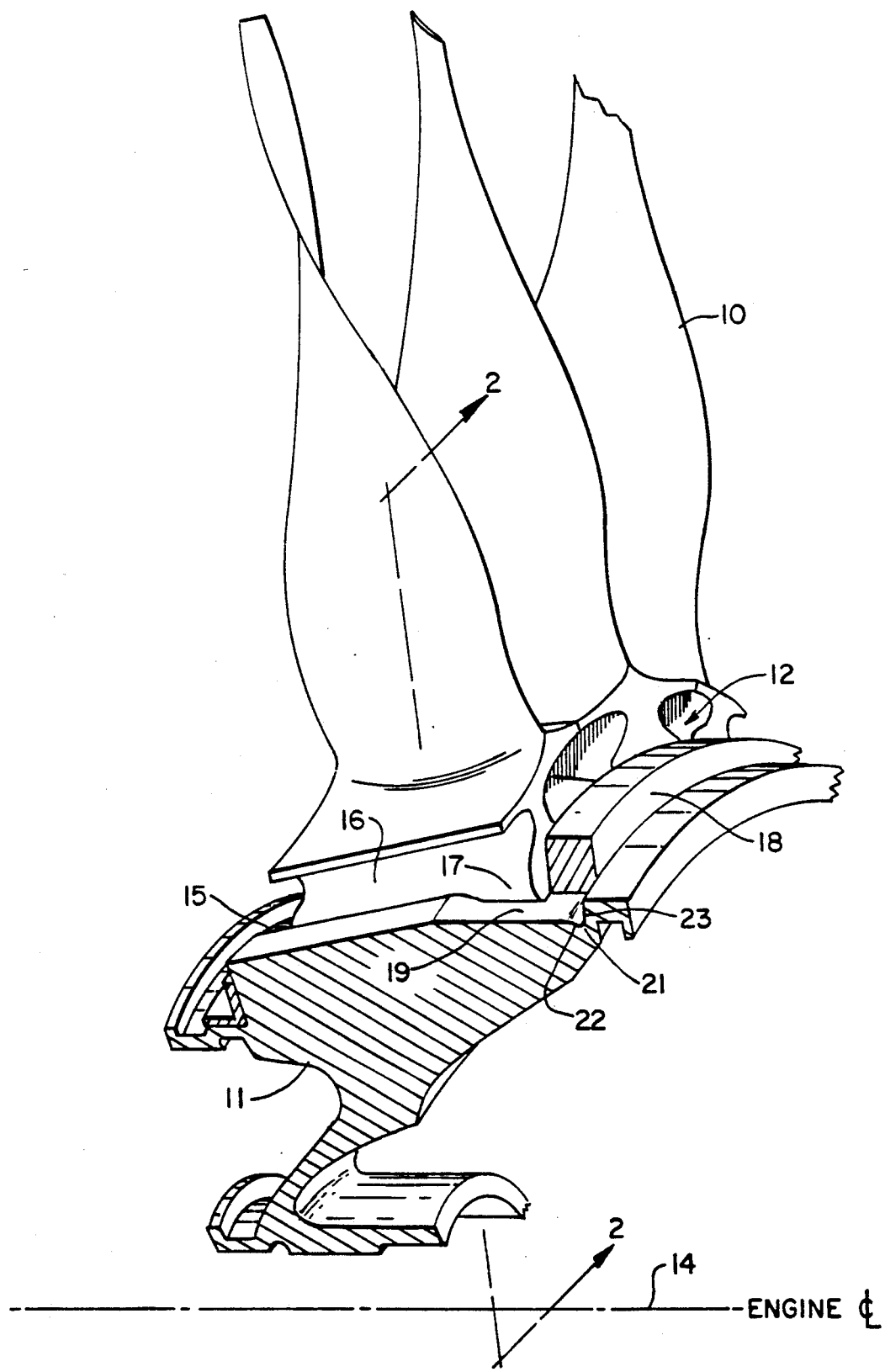
FIG. 1 is a perspective view detailing the single piece collar hub assembly. The figure shows a breakaway of the collar in the groove.
Figure 3:
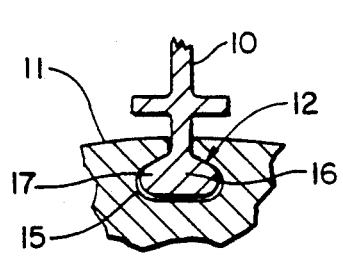
FIG. 3 is a sectional view of the dovetail joint between the fan blade and the hub.
Figure 2:
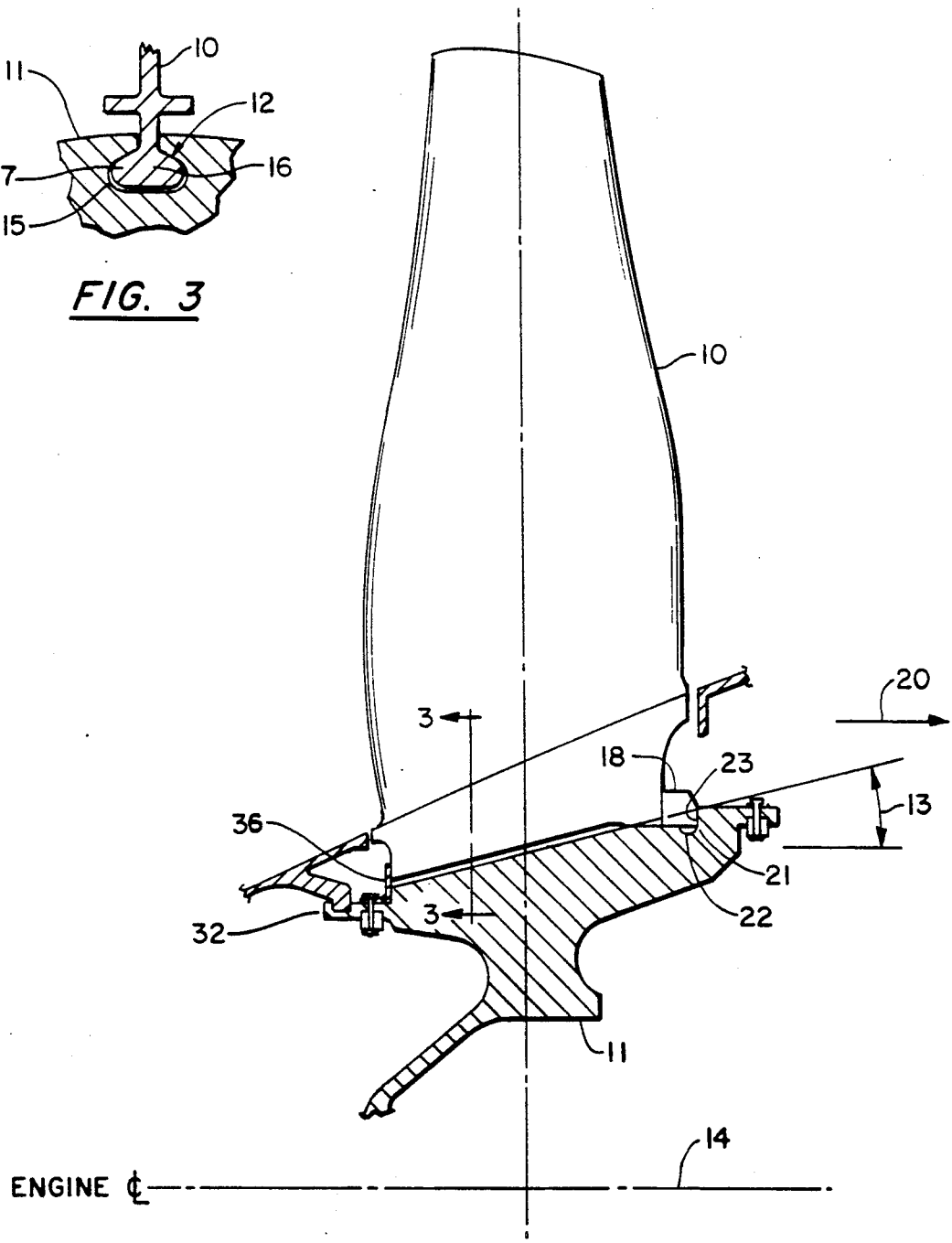
FIG. 2 is a cross-sectional view of the hub with the blade positioned in the dovetail. This view shows a cross-sectional view of the collar and the front ring attached to the hub.

Referring to FIG. 1, FIG. 2, and FIG. 3, a fan blade 10 is attached to the rotating hub 11 of a turbofan engine. The fan blade 10 is attached to the hub 11 by a dovetail joint 12 which is sloped at an angle 13 relative to the engine centerline 14. The dovetail channel 15 is broached in the hub 11 and the base of the blade root 16 is formed into the corresponding male dovetail 17.

Once fully received within the dovetail channel 15, the blade root 16 is prevented from moving aftward, up the incline 13, by an annular collar 18. As shown in FIG. 1 and FIG. 2, the collar 18 may comprise a single segment. The collar 18 sits in an outward facing circumferential groove 19, cut into the hub 11, that abuts the aft end of the dovetail channel 15. In addition to preventing the blade root 16 from moving aft, the collar 18 also reduces stress in the hub 11 by distributing the aftward component of the centrifugal force load acting on the hub 11 through the blade 10. Stress on the hub 11 is further reduced by a fillet 22 positioned on the aft inside corner 21 of the groove 19. The fillet 22 on the aft inside corner 21 is a large radius fillet that undercuts the corner. Since the aft wall 23 of the groove 19 directly receives the axial force transmitted by the blade 10 and collar 18, the aft corner fillet 22 dimensions are such that the stress is minimized in that corner 21 of the groove 19. The collar 18 may be placed within the groove 19 following assembly of the hub 11 and blade 10. The radial dimension of the collar 18 is sufficient to block aftward movement of the blade root 16.

Figure 4:
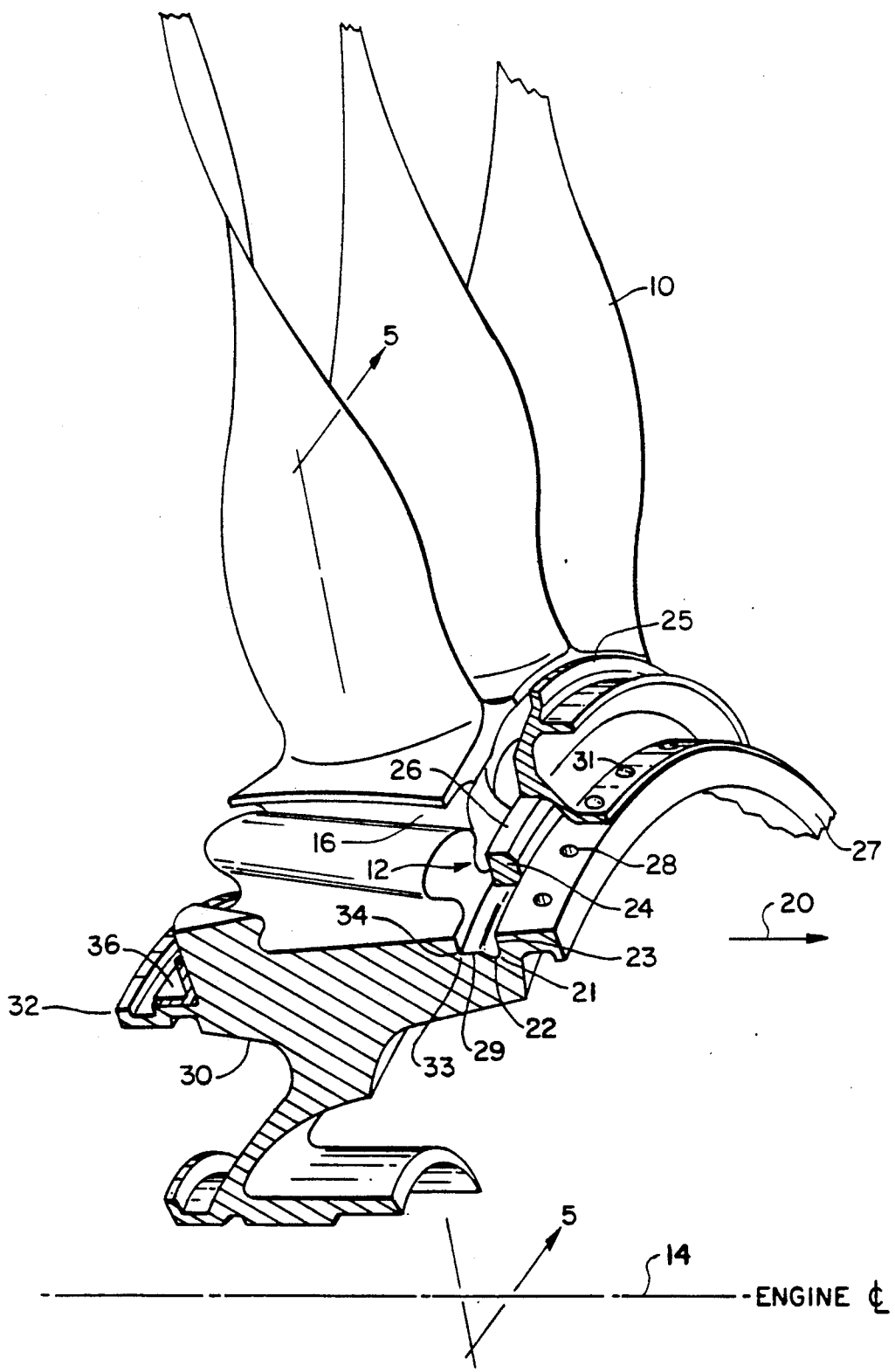
FIG. 4 is a perspective view detailing the segmented collar hub assembly. The figure shows a breakaway of the segmented collar in the groove and the rear cover plate holding the collar within the groove.
Figure 5:
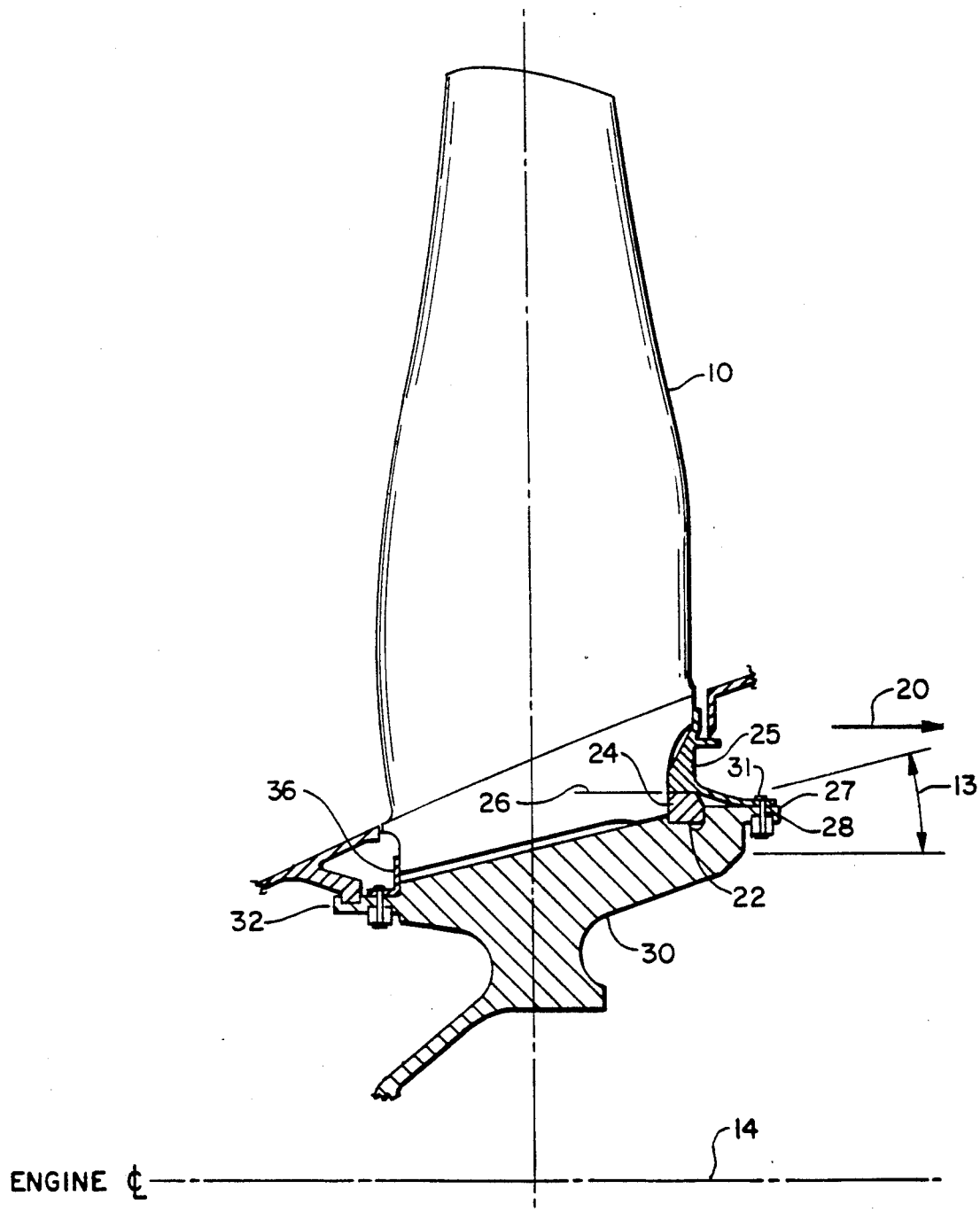
FIG. 5 is a cross-sectional view of the hub with the blade positioned in the dovetail. This view shows a cross-sectional view of the segmented collar, the rear cover plate, and the front ring attached to the hub.

Now referring to FIG. 4 and FIG. 5, the blade root 16 may also be prevented from traveling aftward, up the incline 13, by a segmented collar 24. The segmented collar 24 comprises a plurality of segments 24 which sit in an outwardly facing circumferential groove 29 cut into the hub 30. As in the single piece collar embodiment, the aft inside corner 21 fillet 22 may be a stress reducing large radius fillet that undercuts the corner. In addition, the forward inside corner 33 may also include a stress reducing fillet 34. The segmented collar 24 is held radially within the groove 29 by an annular rear cover plate 25. The cover plate 25 slides over the outer diameter 26 of the assembled segmented collar 24 and is secured by rivets 31, for example, to the hub 30 on a flange 27 extending aftward of the hub 30. Rivet holes 28 in the hub flange 27 are located outside the high stress zone around the groove 29 which is created by the axial force on the groove 29. In this configuration, these holes 28 are the only holes necessary for axially retaining the fan blade 10 in the aft direction 20. At the other end of the dovetail channel 12, the smaller diameter end 32, of either the single piece collar hub 11 or the segmented collar hub 30, the blade 10 may be prevented from sliding out the dovetail channel 15 by a front ring 36, or any other retention device known in the art.

We claim:

1. A device for retaining a blade for an axial fan having a dovetail root received within a corresponding dovetail channel in an annular hub, wherein the dovetail channel further slopes radially outward with respect to the fan axial, comprising:
    a radially outward facing circumferential groove cut into the exterior surface of the annular hub, wherein the groove is adjacent to the aft end of the dovetail channel;
    a plurality of collar segments received within said groove, wherein said segments each have a radial dimension sufficient to block aftward movement of the blade root beyond the end of the dovetail channel; and
    an annular rear cover plate secured to the hub and disposed circumferentially around the hub, and closely fitting around said collar segments, thereby holding said segments radially within said groove.

2. A device for retaining a blade for an axial fan according to claim 1, wherein:
    said rear cover plate is attached to the hub by rivets on a flange which extends aft, outside of the stress zone produced by the axial loading on the circumferential groove.

3. A device for retaining a blade for an axial fan according to claim 1, wherein:
    said circumferential groove comprises two inside corners, wherein both corners contain stress reducing fillets.

4. A device for retaining a blade for an axial fan according to claim 3, wherein said aft inside corner contains a stress reducing fillet which undercuts the corner.

* * * * *